United States Patent
Bannon et al.

(10) Patent No.: US 6,758,494 B2
(45) Date of Patent: Jul. 6, 2004

(54) STEERING COLUMN WITH ROTARY TILT MECHANISM AND METHOD OF INSTALLATION

(75) Inventors: Sean A Bannon, Bloomfield Hills, MI (US); William A Jolley, Waterford, MI (US); Benjamin S Basa, Jr., Grand Blanc, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 182 days.

(21) Appl. No.: 10/034,210

(22) Filed: Dec. 28, 2001

(65) Prior Publication Data

US 2003/0122358 A1 Jul. 3, 2003

(51) Int. Cl.$^7$ .................................................. B62D 1/18
(52) U.S. Cl. ........................................ 280/775; 74/493
(58) Field of Search ............................ 280/775; 74/493, 74/492

(56) References Cited

U.S. PATENT DOCUMENTS

| | | | | |
|---|---|---|---|---|
| 4,796,481 A | * | 1/1989 | Nolte ........................... | 74/493 |
| 4,900,059 A | * | 2/1990 | Kinoshita et al. ............ | 280/775 |
| 5,035,446 A | * | 7/1991 | Arvidsson .................... | 280/775 |
| 5,172,576 A | * | 12/1992 | Milton ......................... | 70/185 |
| 5,178,411 A | * | 1/1993 | Fevre et al. ................. | 280/775 |
| 5,409,261 A | * | 4/1995 | Yamaguchi .................. | 280/775 |
| 5,439,252 A | * | 8/1995 | Oxley et al. ................. | 280/775 |
| 5,848,557 A | * | 12/1998 | Sugiki et al. ................. | 74/493 |
| 6,167,777 B1 | * | 1/2001 | Snell ............................ | 74/493 |
| 2003/0172766 A1 | * | 9/2003 | Masucci ....................... | 74/493 |

* cited by examiner

Primary Examiner—Ruth Ilan
(74) Attorney, Agent, or Firm—Ralph E. Smith

(57) ABSTRACT

An articulated, tiltable steering column and method for installing the same is provided. The steering column includes a locking mechanism for retaining upper and lower column members in selected positions of adjustment. The locking mechanism includes a rod received by and slidable along a longitudinal axis within a sleeve. A collar is journalled around the sleeve and includes diametrically opposed bores for receiving the shaft. A biasing member is secured on a first end to a mounting portion extending from the sleeve and is secured on a second end by the collar.

19 Claims, 6 Drawing Sheets

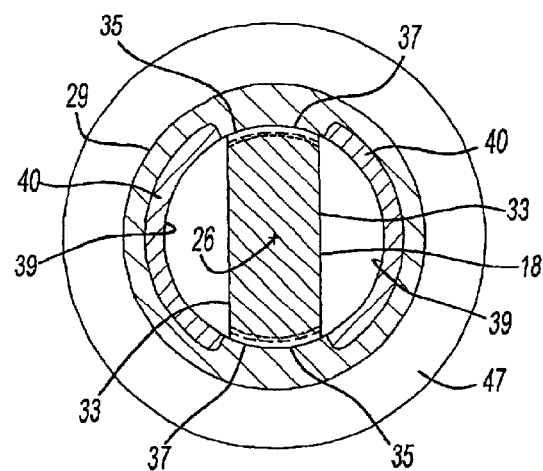
_Fig-4_
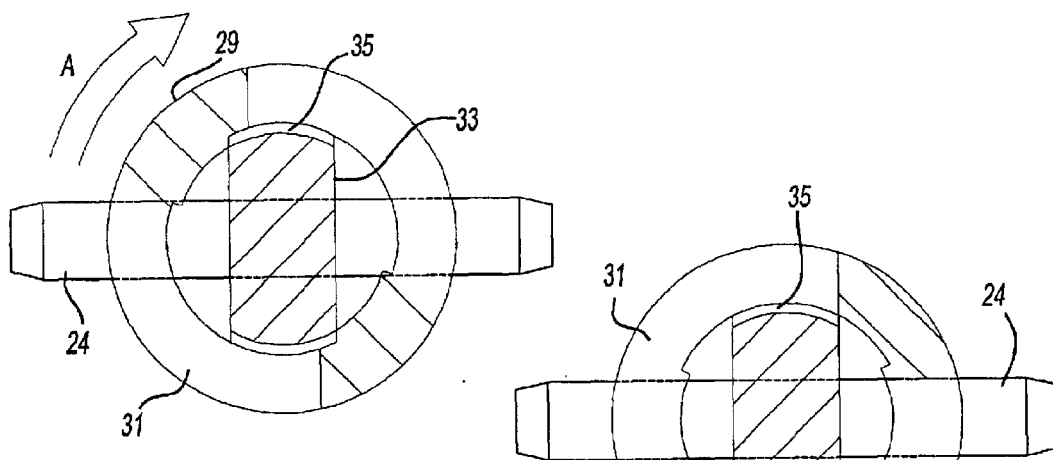
_Fig-5_
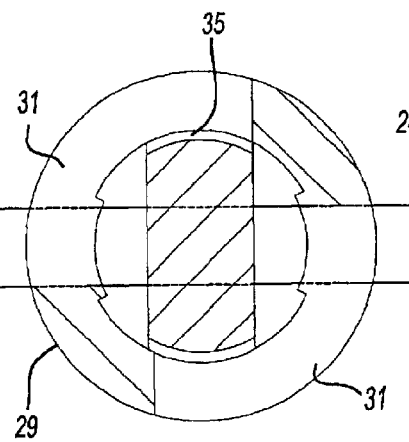
_Fig-6_

STEERING COLUMN WITH ROTARY TILT MECHANISM AND METHOD OF INSTALLATION

FIELD OF THE INVENTION

The present invention relates to tiltable steering column assemblies for motor vehicles, and more particularly to a rotary tilt mechanism having an improved locking mechanism.

BACKGROUND OF THE INVENTION

Vehicle steering columns are often provided with a tiltable component that enables the steering wheel to be set at varying degrees of tilt, according to the desires and needs of different persons that might have occasion to drive a vehicle. Typically a manually operable lock mechanism is provided for retaining the steering wheel component in selected positions of tilt adjustment.

In one conventional rotary tilt mechanism an externally threaded rod is provided including pivot connections incorporated on opposite ends. A sleeve encircles the rod and is biased into a locking relationship with the rod by a biasing member. A lever is incorporated on the steering column in which the driver may actuate to overcome the bias. Actuation of the lever allows the rod to move into an unlocked position whereby the rod may slidably translate within the sleeve toward a desired position of tilt. Once the steering wheel is pivoted into the desired position, the lever is disengaged and the sleeve is biased into a locked relationship with the rod.

The biasing member conventionally is coupled on one end to an outer portion of the sleeve and on the other end to a pivot shaft. The pivot shaft transversely extends through passages incorporated on the sleeve and rod and operably connects to a lower stationary column member. In such a configuration wherein the biasing member is coupled to the pivot shaft, undesirable loads may be transferred to the passage walls formed on the sleeve and rod. Continued loads on the passage walls may encourage premature fatigue on the rod and sleeve.

Generally, assembly of such a rotary tilt mechanism includes rotating the rod and sleeve against the bias to a position in which an axial slot formed on the rod is aligned with a transverse slot formed in the sleeve to create a mounting passage. Next, a shipping pin or "dummy pin" is disposed through the mounting passage to preclude the biasing member from rotating the rod and sleeve out of position. When the rotary tilt mechanism is prepared for installation in a vehicle, a pivot pin is inserted into the mounting passage thereby displacing the shipping pin from the mechanism.

The rotary tilt mechanism of the present invention provides a configuration which minimizes loads transferred onto the passage walls while providing other improvements which increase the longevity and overall robustness of the mechanism.

SUMMARY OF THE INVENTION

The present invention provides an articulated, tiltable steering column including an upper steering wheel column member, and a lower stationary steering column member, and a pivot connection between the upper and lower column members, whereby a steering wheel can be tiltably adjusted around the pivot connection to selected positions of adjustment. A locking mechanism retains the column members in selected positions of adjustment. The locking mechanism further includes a rod disposed between the column members. The rod is received by and slidable along a longitudinal axis within a sleeve. The rod and sleeve include a passage formed therein for receiving a shaft. A collar is journalled around the sleeve including diametrically opposed bores for receiving the shaft. A biasing member is secured on a first end to a mounting portion extending from the sleeve and secured on a second end by the collar. The biasing member provides a rotational bias on the sleeve.

The present invention further provides a method of installing a rotary tilt mechanism in a motor vehicle. The rotary tilt mechanism includes a rod disposed within and selectively translatable along a longitudinal axis within a sleeve. The sleeve is rotatably biased around the rod by a biasing member. The tilt mechanism includes a first mounting shaft coupled to an upper steering wheel column member and a second mounting shaft coupled to a lower steering wheel column member. A collar is slid along the longitudinal axis of the sleeve to a predetermined location and engaged to a first end of the biasing member. The collar is then rotated in a direction of increased bias to a location allowing passages in the collar to align with passages on the sleeve and rod, thereby creating a mounting passage. A locking element is advanced along the sleeve to a position precluding the collar from rotating. One of the first and second mounting shafts is inserted through the mounting passage.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 4 is a transverse sectional view taken along line 4—4 of FIG. 3.

FIG. 5 is a transverse sectional view taken along line 5—5 of FIG. 3.

FIG. 6 is the sectional view of FIG. 5, showing the locking components in a different position of adjustment.

DETAILED DESCRIPTION OF THE PREFERRED EMBODIMENTS

The following description of the preferred embodiment(s) is merely exemplary in nature and is in no way intended to limit the invention, its application, or uses.

Figure 1:
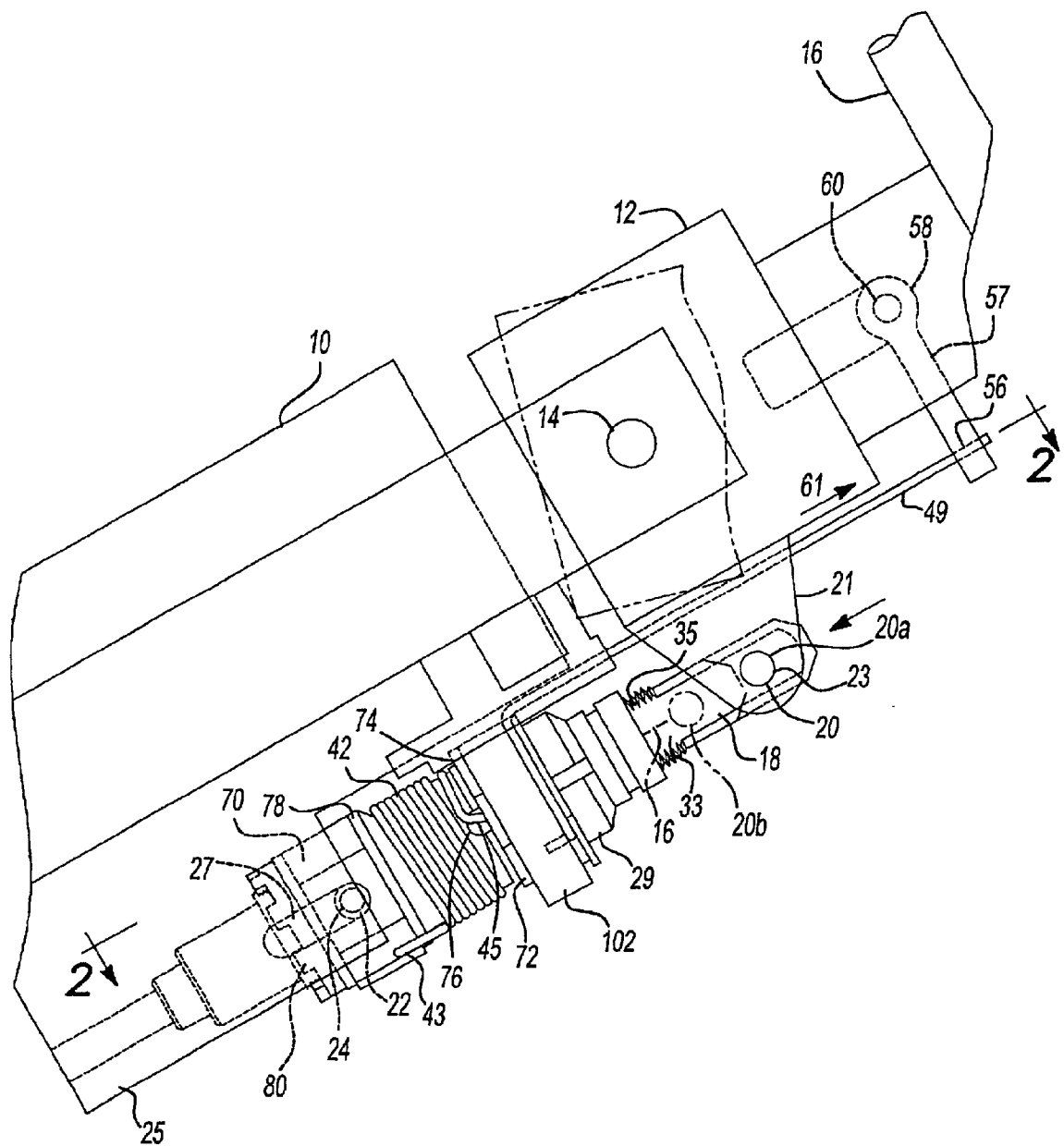
FIG. 1 is a fragmentary side elevational view of a vehicle steering column having a tilt lock mechanism of the present invention installed thereon.

Referring to FIG. 1, there is shown a vehicle steering column assembly that includes a lower stationary column member 10 and an upper tiltable steering column member 12 connected together by a pivot connection 14, whereby column member 12 is capable of tilting adjustment around the pivot connection axis. A steering wheel 16 is located at the upper end of column member 12. The interior spaces within column members 10 and 12 are occupied by rotary shafts that are connected by a universal joint centered on the axis of pivot connection 14. Steering wheel 16 is attached to the shaft located within column member 12.

The present invention is concerned with a locking mechanism for retaining column member 12 in selected positions of tilt adjustment. In FIG. 1, dashed lines show the downward limit of tilt adjustment for column member 12. Column member 12 can be tilted upwardly from the full line position to a similar extent. Typically, column member 12 can be tiltably adjusted downwardly from its full line position by approximately thirteen degrees, and upwardly from its full line position by a similar number of degrees.

The locking mechanism for retaining column member 12 in selected positions of tilt adjustment (up or down) includes an externally threaded rod 18 having a first pivot connection 20 to column member 12 and a second pivot connection 22 to column member 10. By adjusting the location of the pivot connection 22 on the longitudinal axis 26 of rod 18 it is possible to vary the effective length of the rod 18 and the tilt angle of column member 12 around the axis of pivot connection 14.

Pivot connection 20 includes two parallel ears 21 extending downwardly from column member 12, and a pivot shaft 23 extending transversely through ears 21 and the upper end of rod 18. Pivot connection 22 includes a pivot shaft 24 extending between two parallel ears 25 depending from column member 10. Pivot connection 22 further includes an axial slot 27 formed in rod 18, such that shaft 24 extends transversely through the slot. Rod 18 can rotate on shaft 24, and also slide longitudinally on the shaft 24 to vary the effective length of the rod, i.e. the distance between pivot connections 22 and 20.

Rod 18 is longitudinally stabilized on shaft 24 by means of a sleeve 29 that encircles the rod 18. The sleeve 29 has two arcuate circumferential slots 31 engage shaft 24, whereby the sleeve 29 can be rotated on rod 18 a limited distance around rod axis 26. In the illustrated apparatus, slots 31 permit sleeve 29 to rotate approximately ninety degrees around rod axis 26. FIG. 5 shows sleeve 29 at one limit of the sleeve rotational movement. FIG. 6 shows sleeve 29 at the other limit of the rotational movement.

Rod 18 has two parallel flat side surfaces 33 extending the full length of the rod 18, and two arcuate serrated surfaces 35 connecting flat surfaces 33. The serrations form diametrically opposed external teeth on the rod 18. The serrated arcuate surfaces 35 are centered on rod axis 24. Flat surfaces 33 span through the serrated surfaces 35 such that serrated surfaces 35 do not overhang at an angle with respect to flat surfaces 33.

Sleeve 29 has two internal arcuate serrated surfaces 37 separated by two arcuate smooth surfaces 39. The internal teeth formed by serrated surfaces 37 have the same pitch as the external teeth 35 on rod 18, so that when sleeve 29 is rotated to the position depicted in FIGS. 4 and 5 the internal teeth on the sleeve mesh with the external teeth on rod 18.

When sleeve 29 is rotated to the position depicted in FIG. 4, the meshed teeth prevent axial movement of rod 18 within sleeve 29. Slots 31 in the sleeve are in a circumferential plane that intersects the axial plane of slot 27 in rod 18, whereby sleeve 29 prevents the rod from movement relative to pivot shaft 24.

When sleeve 29 is rotated in the direction of arrow A from the position depicted in FIG. 5 to the position depicted in FIG. 6, the internal teeth in sleeve 29 are out of mesh with the external teeth on rod 18. Rod 18 can thereby be moved longitudinally (on rod axis 26) along shaft 24 a limited distance dictated by the length of slot 27. Such movement of the rod 18 can be used to move pivot shaft 23 around pivot connection 14, thereby adjusting the tilt angle of column member 12.

Referring to FIG. 1, pivot connection 20 is shown in two limit positions, i.e., a limit position 20a, wherein rod 18 is advanced upwardly to tilt column member 12 upwardly; and a second limit position 20b, wherein rod 18 is retracted downwardly to tilt column member downwardly. Slot 27 limits the rod 18 movement. Rod 18 can have various adjusted positions between limiting positions 20a and 20b. The number of discrete rod positions is determined by the pitch distance for the teeth on rod 18 and sleeve 29.

During longitudinal movement of rod 18 within sleeve 29, internal arcuate surfaces 39 on the sleeve act as bearings to maintain the rod in a centered position relative to the sleeve. For manufacturing reasons, each smooth arcuate surface 39 is formed by an arcuate insert member 40 installed within sleeve 29 after the sleeve has been machined to form the diametrically opposed serrated surfaces 37. The exposed arcuate surfaces 39, formed by inserts 40, have a diameter that is the same as the diameter of the arcuate toothed surfaces 35 on rod 18. When sleeve 29 is in the position depicted in FIG. 6, the arcuate smooth surfaces will function as bearing surfaces to maintain the sleeve 29 in a centered position on rod 18; i.e., the axis of sleeve 29 is coincident with the rod axis 26. This is beneficial in that the rod 18 can be moved axially within the sleeve 29 without binding or cocking in the sleeve.

Each arcuate insert 40 extends from the right end of sleeve 29 about one half the sleeve length. Inserts 40 are not visible in FIGS. 5 and 6 because the viewing plane for FIG. 5 is beyond the ends of the inserts.

Figure 2:
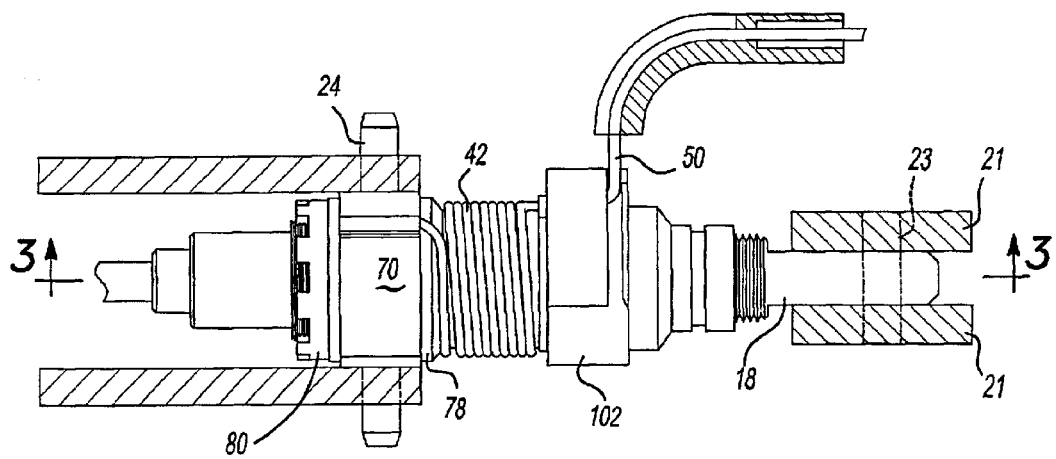
FIG. 2 is a fragmentary sectional view taken along line 2—2 of FIG. 1.
Figure 3:
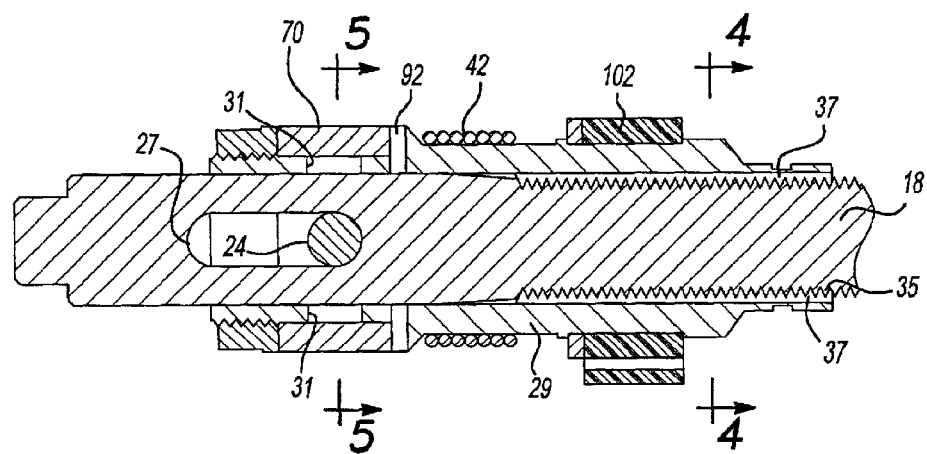
FIG. 3 is a sectional view taken along line 3—3 of FIG. 2.

Sleeve 29 is rotated to the position depicted in FIG. 5 by a torsion coil spring 42. As shown in FIGS. 1 and 2, end 43 of the torsion spring is anchored to collar or trunion 70. The other end 45 of the torsion spring extends into a small hole 100 formed in an externally mounted snap ring 72. Snap ring 72 is bounded on a first side circumferential wall 74. A notch (not specifically shown) is incorporated in circumferential wall 76 to allow end 45 of torsion spring to gain access to snap ring 72. The torsion coil spring 42 is wound so as to exert a counterclockwise biasing force on sleeve 29, as the sleeve is viewed in FIG. 4.

With continued reference to FIGS. 1, 2 and 7, trunion 70 will be explained in greater detail. Trunion 70 is bounded on a first end by thrust wall 78 and on a second end by castle nut 80. Trunion 70 includes diametrically opposed bores 82 incorporated therein. The diameter of the bores 82 is preferably generally equal to the width of pivot shaft 24, whereby an interference fit is provided therebetween. Trunion 70 further includes an ear or dog 84 having a wall portion 86 tangentially extending from an outer wall 88 and forming a groove portion 90 between the outer wall 88 and the tangentially extending wall 86. The groove portion 90 anchors the first end of the torsion spring 43 onto trunion 70. The rotational force transmitted by torsion spring 42 onto trunion 70 is translated to pivot shaft 24. In this manner, the interface fit between pivot shaft 24 and the diametrically opposed bores 82, precludes any rotational biasing force to be absorbed by the walls of slot 27. For additional support, the wall thickness of the trunion 70 near bores 82 is increased.

During assembly, trunion 70 is advanced onto sleeve 29 until contacting thrust wall 92. Upon engaging ear 84 of trunion 70 with second end 43 of torsion spring 42, the trunion 70 is influenced in a clockwise direction as viewed in FIG. 5. Castle nut 80 is threadably advanced onto threads 94 of sleeve 29 to secure trunion 70 in a location revealing a continuous passage through the diametrically opposed bores 82 and the slot 27. An adhesive, such as LOCTITE™, is applied to the contact wall of castle nut 80 to encourage a sound bond. Pivot shaft 24 is suitably inserted through the passage and castle nut 80 is backed off to allow for lash adjustment.

The cooperation of castle nut 80 and thrust wall 92 secure trunion 70 in a position aligning bores 82, slot 27 and slot 31 to allow pivot shaft 24 to be readily inserted during assembly through the passage without the need to remove a "dummy pin", which would otherwise provide necessary alignment.

Figure 7:
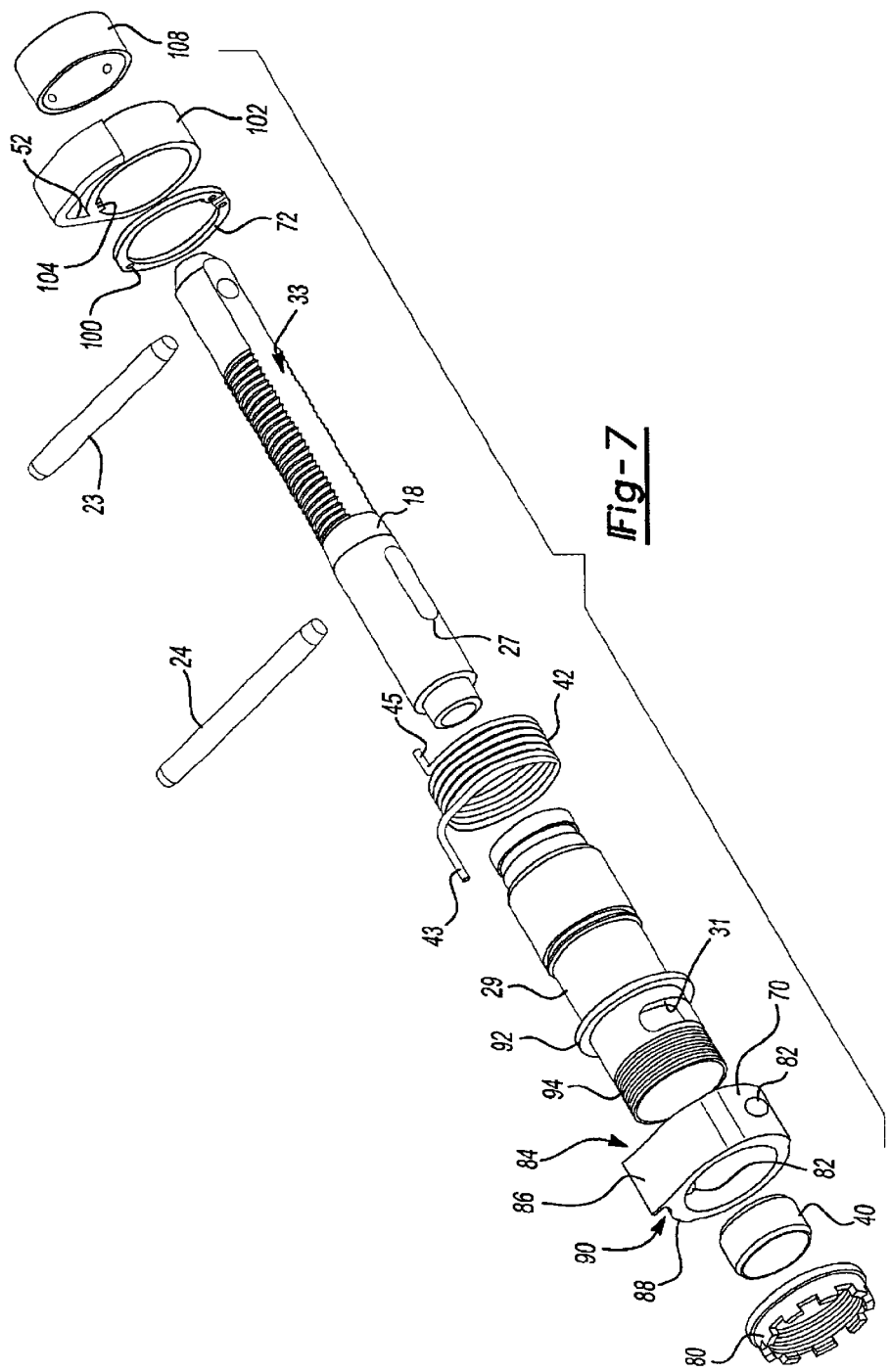
FIG. 7 is an exploded perspective view of the rotary tilt mechanism of the present invention.
Figure 8:
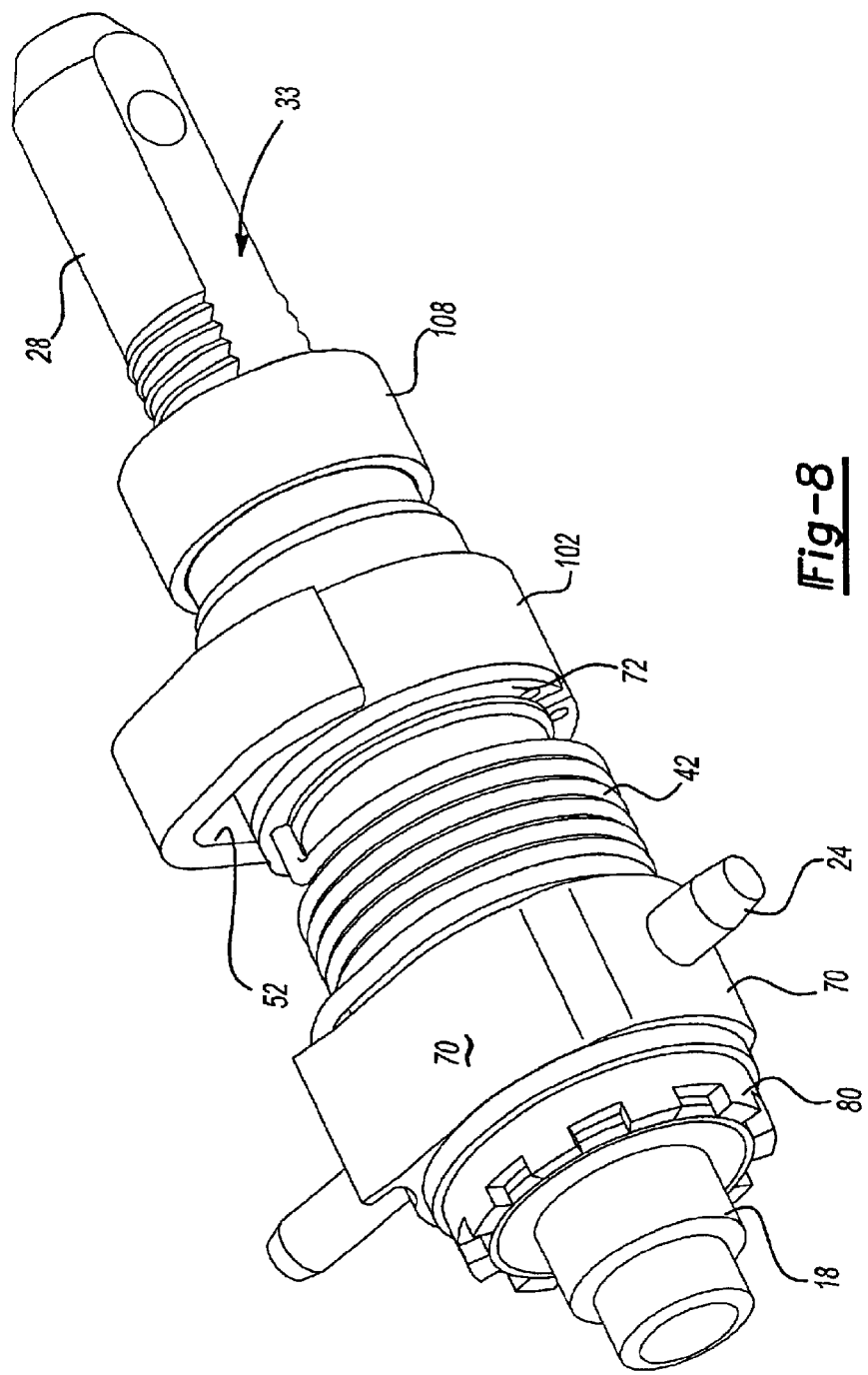
FIG. 8 is a perspective view of the rotary tilt mechanism of the present invention.
Figure 9:
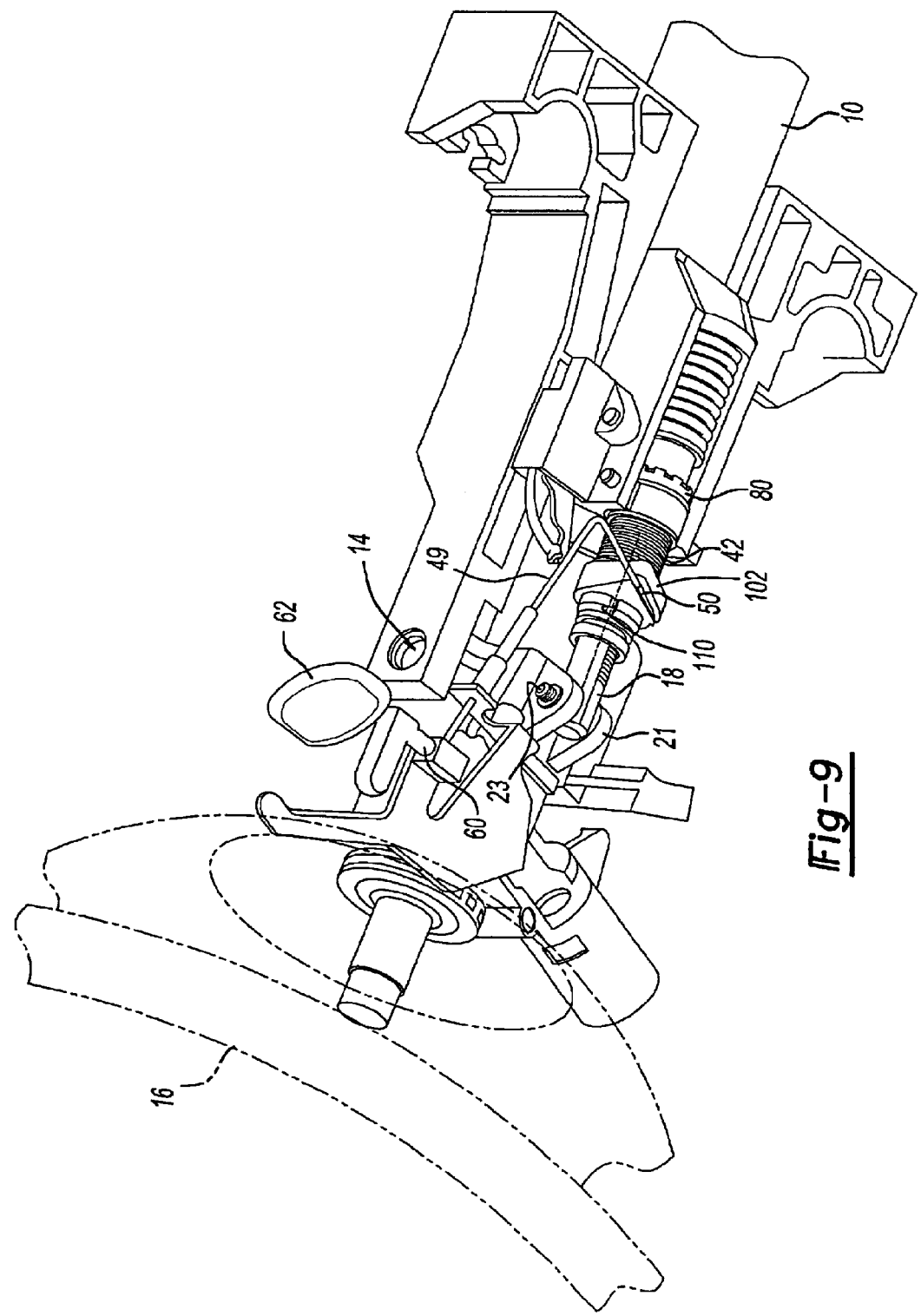
FIG. 9 is a bottom perspective view of the rotary tilt mechanism shown installed within a tilt lock vehicle steering column according to the present invention.

With continued reference to FIG. 7 and additional reference to FIGS. 8 and 9, sleeve 29 is rotated to the position depicted in FIG. 6 by a manual cable means, referenced generally by numeral 49. Cable means includes a flexible wire (small diameter cable) 50 having one end anchored at 52 to hook sleeve 102. Hook sleeve 102 has a tooth engaging a retaining channel 110 formed on sleeve 29 to prevent relative rotation between the hook sleeve 102 and sleeve 29. An end collar 108 is disposed on the ends of sleeve 29. The flexible wire 50 extends partially around the grooved flange on sleeve 29, and then around an arcuate guide 54 that is suitably attached to the undersurface of column member 10.

As shown in FIG. 1, cable means 49 extends rightwardly from hook collar 102 to an anchored connection 56 with an arm 57. Arm 57 has a hub portion 58 that is rotatable on a shaft 60 extending laterally from column member 12. The outer end of shaft 60 mounts a manually depressible handle 62.

Manual depression of handle 62 around the shaft 60 axis moves wire 50 in the arrow 61 direction (FIG. 1), such that the wire 50 rotates sleeve 29 in a clockwise direction as viewed in FIG. 5. When handle 62 is manually depressed, sleeve 29 is rotated from the position depicted in FIG. 5 to the position depicted in FIG. 6. When the manual pressure on handle 62 is removed, torsion spring 42 rotates sleeve 29 from the position shown in FIG. 6 to the position shown in FIG. 5.

FIG. 5 depicts the normal position of sleeve 29, wherein the external teeth on rod 18 are in mesh with the internal teeth on sleeve 29. The sleeve is locked to rod 18 so that the rod 18 forms a rigid connection between shaft 23 on column member 12 and shaft 24 on column member 10. Column member 12 is thereby retained in a fixed position relative to column member 10.

In order to change the tilt setting of column member 12 (up or down around pivot connection 14) handle 62 is manually depressed to rotate sleeve 29 from the position depicted in FIG. 5 to the position depicted in FIG. 6. The internal teeth on sleeve 29 are thereby moved out of mesh with the external teeth on rod 18, as shown in FIG. 7. Column member 12 can then be freely rotated around the axis of pivot connection 14 to any desired tilted position within limits.

When column member 12 is moved around the axis of pivot connection 14, rod 18 slides freely along rod axis 26 to establish a new relation between slot 27 and shaft 24. The effective length of rod 18 between shafts 23 and 24 is changed in accordance with the movement of column member 12. With column member 12 in the new (desired) position, manual pressure on handle 62 is released, such that torsion coil spring 42 returns sleeve 29 to the position depicted in FIGS. 4 and 5. The internal teeth on sleeve 29 move into mesh with the external teeth on rod 18, such that rod 28 is prevented from longitudinal axial movement along rod axis 26. Sleeve 29 serves as a rigid connector between rod 18 and shaft 24.

When in the locked position, the internal teeth on sleeve 29 cannot inadvertently disengage from the external teeth on rod 18. As shown in FIG. 4, rod 18 completely fills the vertical space within sleeve 29. The sleeve 29 cannot vibrate in the vertical plane so as to disengage the meshed teeth.

In any locked position, a relatively large number of teeth are in mesh. Rod 18 has teeth on both its upper surface and its lower surface. Also, the rod 18 and sleeve 29 have large cross section walls presented to the expected load forces (acting primarily parallel to rod axis 26). This arrangement also provides a high degree of adjustment with many tilt positions. In one embodiment, this design provides thirteen positions of adjustment.

The illustrated locking mechanism can be constructed as a relatively small size assembly without greatly reducing its strength or ability to handle the expected load forces. As shown in the drawings, the locking mechanism is located externally relative to column members 10 and 12, such that the locking mechanism can be modularized as a separate assembly capable of interchangeable use with a range of different steering columns without extensive tooling changes or structural modifications in the locking mechanism or steering column.

The drawings show rod 18 as having an adjustment slot 27 and sleeve 29 cooperable with shaft 24 on the stationary column member 10. However, the adjustment slot 27 and sleeve 29 could be relocated so as to interact with shaft 23 on movable column member 12.

Within the broader scope of the invention, it is believed that the illustrated locking mechanism could be used with movable and stationary members other than the steering column members.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An articulated, tiltable steering column for a steering wheel, the column comprising:
  an upper steering wheel column member;
  a lower stationary steering column member;
  a pivot connection between the upper and lower column members allowing the steering wheel to be tiltably adjusted about the pivot connection to selected positions of adjustment;
  a locking mechanism for retaining the upper and lower column members in selected positions of adjustment, the locking mechanism including a rod disposed between the upper and lower column members, the rod received by and slidable along a longitudinal axis within a sleeve, the rod and sleeve including a passage formed therein for receiving a shaft;

a collar journalled around the sleeve and including diametrically opposed bores for receiving the shaft; and a biasing member secured at a first end to a mounting portion extending from the sleeve and secured at a second end by the collar, the biasing member providing a rotational bias on the sleeve.

2. An articulated, tiltable steering column for a steering wheel, the column comprising:

an upper steering wheel column member;

a lower stationary steering column member;

a pivot connection between the upper and lower column members allowing the steering wheel to be tiltably adjusted about the pivot connection to selected positions of adjustment;

a locking mechanism for retaining the upper and lower column members in selected positions of adjustment, the locking mechanism including a rod disposed between the upper and lower column members, the rod received by and slidable along a longitudinal axis within a sleeve, the rod and sleeve including a passage formed therein for receiving a shaft;

a collar journalled around the sleeve and including diametrically opposed bores for receiving the shaft, wherein the collar is retained at a first end by an annular wall extending from the sleeve and retained at a second end by a nut threadably received by the sleeve; and a biasing member secured at a first end to a mounting portion extending from the sleeve and secured at a second end by the collar, the biasing member providing a rotational bias on the sleeve.

3. The steering column of claim 1, wherein the biasing member creates a load transmitted by the second end to the collar and generally carried by the shaft.

4. The steering column of claim 1, wherein the outer diameter of the shaft is substantially equal to the diameter of the diametrically opposed bores.

5. The steering column of claim 4, wherein the shaft provides an interference fit with the diametrically opposed bores.

6. The steering column of claim 1, wherein the mounting portion of the first end of the biasing member includes a snap ring journalled around the sleeve.

7. A method of installing a rotary tilt mechanism in a motor vehicle, the rotary tilt mechanism having a rod disposed within and selectively translatable along a longitudinal axis within a sleeve, the sleeve rotatably biased around the rod by a biasing member, the tilt mechanism further including a first mounting shaft coupled to an upper steering wheel column member and a second mounting shaft coupled to a lower steering wheel column member, the method comprising the steps of;

sliding a collar along the longitudinal axis of the sleeve to a predetermined location;

engaging the collar to a first end of the biasing member;

creating a mounting passage by rotating the collar in a direction of increased bias to a location aligning passages incorporated in the collar with passages incorporated on the sleeve and the rod;

advancing a locking element along the sleeve to a position precluding rotation of the collar; and inserting one of the first and second mounting shafts through the mounting passage.

8. The method of claim 7, wherein the step of sliding the collar along the longitudinal axis to a predetermined location includes the step of positioning a first end of the collar against a thrust wall radially extending from the sleeve.

9. The method of claim 7, wherein the step of engaging the collar to a first end of the biasing member includes the step of placing the first end of the biasing member in a groove formed on the collar between an outer wall and a tangentially extending ear formed on the outer wall of the collar.

10. The method of claim 7, wherein the step of advancing the locking element includes the step of advancing an engagement side of the locking element into engagement with a second end of the collar.

11. The method of claim 10, wherein the step of advancing the engagement side of the locking element includes the step of applying an adhesive on one of the engagement side of the locking element and the second end of the collar.

12. The method of claim 7, wherein the step of advancing the locking element along the sleeve to a position precluding the collar from rotating includes the step of placing the collar in a position axially compressing the collar between the locking member and the thrust wall.

13. A method of installing a rotary tilt mechanism in a motor vehicle, the rotary tilt mechanism having a rod disposed within and selectively translatable along a longitudinal axis within a sleeve, the sleeve rotatably biased around the rod by a biasing member, the tilt mechanism further including a first mounting shaft coupled to an upper steering wheel column member and a second mounting shaft coupled to a lower steering wheel column member, the method comprising the steps of;

positioning a collar into engagement with a first end of the biasing member;

rotating the collar in a direction of increased bias;

positioning a looking element adjacent to the collar allowing alignment of passages incorporated on the rod, sleeve and collar to form a common mounting passage; and admitting one of the first and second mounting shafts through the mounting passage.

14. The method of claim 13, wherein the step of positioning the collar into engagement with a first end of the biasing member includes the step of positioning a first end of the collar against a thrust wall radially extending from the sleeve.

15. The method of claim 13, wherein the step of positioning the collar into engagement with a first end of the biasing member includes the step of placing the first end of the biasing member in a groove formed on the collar between an outer wall and a tangentially extending ear formed on the outer wall of the collar.

16. The method of claim 14, wherein the step of advancing the locking element includes the step of advancing an engagement side of the locking element into engagement with a second end of the collar.

17. The method of claim 16, wherein the step of advancing the engagement side of the locking element includes the step of applying an adhesive on one of the engagement side of the locking element and the second end of the collar.

18. The method of claim 13, wherein the step of positioning the locking element adjacent the collar allowing alignment of the passages incorporated on the rod, sleeve and collar to form a mounting passage includes the step of advancing the locking element into a position precluding rotation of the collar.

19. The method of claim 18, wherein the step of advancing the locking element into a position precluding rotation of the collar includes advancing the locking element into a position axially compressing the collar between the locking element and the thrust wall.

* * * * *